(12) United States Patent
Fresco et al.

(10) Patent No.: US 7,960,313 B2
(45) Date of Patent: Jun. 14, 2011

(54) COMBINATORIAL PROCESSING INCLUDING STIRRING

(75) Inventors: Zachary Fresco, Santa Clara, CA (US); Nitin Kumar, Menlo Park, CA (US)

(73) Assignee: Intermolecular, Inc., San Jose, CA (US)

( * ) Notice: Subject to any disclaimer, the term of this patent is extended or adjusted under 35 U.S.C. 154(b) by 847 days.

(21) Appl. No.: 11/763,180

(22) Filed: Jun. 14, 2007

(65) Prior Publication Data

US 2008/0312090 A1   Dec. 18, 2008

(51) Int. Cl.
C40B 60/14 (2006.01)
C40B 60/00 (2006.01)
B01L 3/00 (2006.01)
B01L 99/00 (2010.01)

(52) U.S. Cl. .................... 506/40; 506/33; 422/500
(58) Field of Classification Search ............. 506/3, 33, 506/38, 40
See application file for complete search history.

(56) References Cited

U.S. PATENT DOCUMENTS

| | | | |
|---|---|---|---|
| 5,423,740 A * | 6/1995 | Sullivan et al. ............ 604/22 |
| 5,603,351 A | 2/1997 | Cherukuri et al. |
| 6,040,193 A | 3/2000 | Winkler et al. |
| 6,051,500 A | 4/2000 | Maury et al. |
| 6,063,633 A | 5/2000 | Willson, III |
| 6,179,695 B1 | 1/2001 | Takahashi et al. |
| 6,268,219 B1 | 7/2001 | McBride |
| 6,306,658 B1 | 10/2001 | Turner et al. |
| 6,368,562 B1 | 4/2002 | Yao |
| 6,376,014 B1 * | 4/2002 | Mihalcheon ............ 427/240 |
| 6,432,078 B1 * | 8/2002 | Peyman ............ 604/27 |
| 6,620,027 B2 | 9/2003 | Zutshi et al. |
| 6,751,518 B1 | 6/2004 | Sonderman et al. |
| 6,756,109 B2 | 6/2004 | Warren et al. |
| 6,794,289 B2 | 9/2004 | Hudson |
| 6,818,110 B1 | 11/2004 | Warren et al. |
| 6,834,990 B2 | 12/2004 | Nielsen |
| 6,864,092 B1 | 3/2005 | Turner et al. |
| 6,890,492 B1 | 5/2005 | Turner et al. |
| 6,902,934 B1 | 6/2005 | Bergh et al. |
| 6,924,149 B2 | 8/2005 | Turner et al. |
| 6,955,987 B2 | 10/2005 | Wu |
| 6,994,827 B2 | 2/2006 | Safir et al. |
| 7,025,854 B2 | 4/2006 | Boyd et al. |
| 7,045,358 B2 | 5/2006 | Chandler |
| 7,115,234 B2 | 10/2006 | Freitag et al. |
| 7,172,732 B2 | 2/2007 | Van Erden et al. |
| 7,264,535 B2 | 9/2007 | Guthrie et al. |
| 7,288,229 B2 | 10/2007 | Turner et al. |
| 7,354,332 B2 | 4/2008 | Surana et al. |
| 2002/0106813 A1 | 8/2002 | Smith et al. |
| 2003/0032198 A1 | 2/2003 | Lugmair et al. |

(Continued)

OTHER PUBLICATIONS

Office Action, U.S. Appl. No. 11/838,653, Feb. 27, 2009.

(Continued)

*Primary Examiner* — Jill Warden
*Assistant Examiner* — Charles Hammond

(57) ABSTRACT

Combinatorial processing including stirring is described, including defining multiple regions of a substrate, processing the multiple regions of the substrate in a combinatorial manner, introducing a fluid into a first aperture at a first end of a body to dispense the fluid out of a second aperture at a second end of the body and into one of the multiple regions, and agitating the fluid using an impeller at a second end of the body to facilitate interaction of the fluid with a surface of the substrate.

16 Claims, 18 Drawing Sheets

U.S. PATENT DOCUMENTS

| | | |
|---|---|---|
| 2003/0129927 A1* | 7/2003 | Lee et al. ............... 451/41 |
| 2004/0071888 A1* | 4/2004 | Chondroudis et al. ........ 427/402 |
| 2005/0054268 A1 | 3/2005 | Kistler et al. |
| 2005/0064251 A1 | 3/2005 | Li et al. |
| 2005/0095714 A1* | 5/2005 | Wollenberg et al. ............ 436/55 |
| 2005/0232074 A1 | 10/2005 | Higashihara et al. |
| 2005/0287573 A1 | 12/2005 | Stafslien et al. |
| 2006/0083664 A1 | 4/2006 | Bahr |
| 2006/0205322 A1 | 9/2006 | Kalenian et al. |
| 2007/0029189 A1 | 2/2007 | Zach |
| 2007/0089857 A1* | 4/2007 | Chiang et al. ............ 165/80.2 |
| 2009/0047881 A1 | 2/2009 | Satitpunwaycha et al. |

OTHER PUBLICATIONS

Office Action, U.S. Appl. No. 11/838,653, Oct. 13, 2009.
Notice of Allowance, U.S. Appl. No. 11/838,653, Jan. 11, 2010.
International Search Report, PCT/US2008/072888, Jan. 30, 2009.
Erichsen, Thomas, Combinatorial Microelectrochemistry: Development and Evaluation of an Electrochemical Robotic System, Review of Scientific Instruments, 76, 062204 (2005).
PCT International Search Report, Appl. No. PCT/US2008/066424, Sep. 23, 2008.
Office Action, U.S. Appl. No. 11/838,653, Aug. 20, 2008.

* cited by examiner

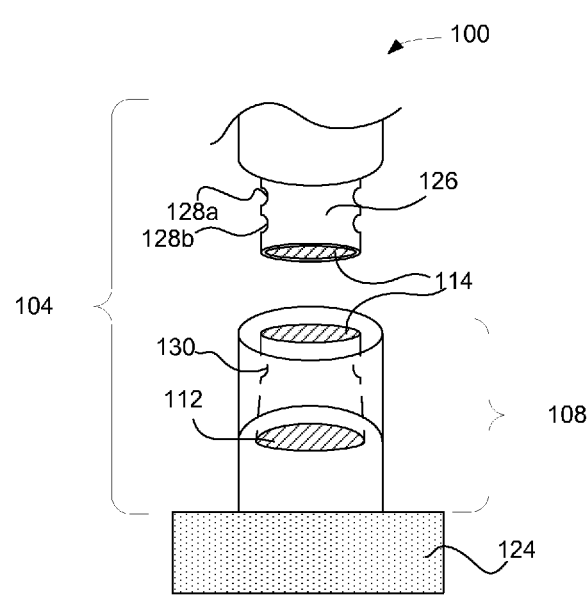
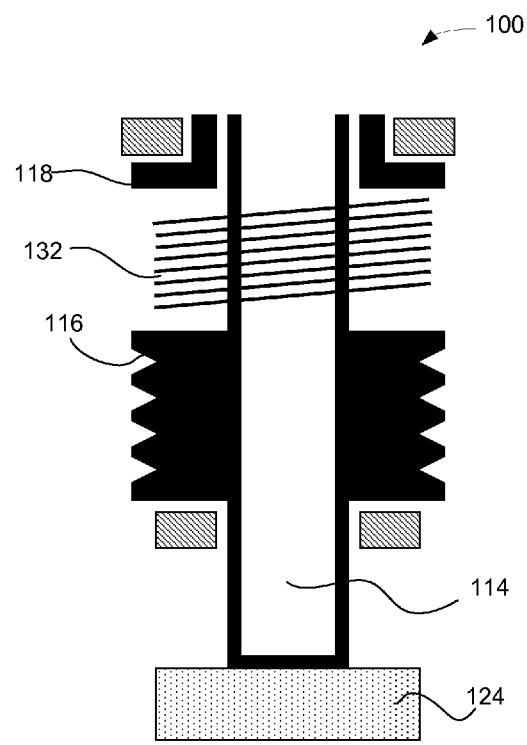
FIG. 1F
FIG. 1G

COMBINATORIAL PROCESSING INCLUDING STIRRING

CROSS-REFERENCE TO RELATED APPLICATIONS

This application is related to U.S. patent application Ser. No. 11/352,077 entitled "Methods for Discretized Processing and Process Sequence Integration of Regions of a Substrate" and filed Feb. 10, 2006, which is herein incorporated by reference.

FIELD OF THE INVENTION

The invention generally relates to combinatorial processing and specifically to techniques for stirring during combinatorial processing.

BACKGROUND OF THE INVENTION

Spin processing may be used to deposit and distribute solutions over substrates. Spin processing may be performed using a spin processor that includes a chuck onto which a substrate is mounted. The chuck is rotatable, and spins while a solution is dispensed onto the center of the substrate. Centrifugal force distributes the solution over the surface of the substrate and excess solution is ejected off the wafer. A spin processor may include devices such as those manufactured by Laurell Technologies Corporation of North Wales, Pa.

Combinatorial processing may refer to various techniques to vary the processes applied to multiple regions of a substrate in serial, parallel or parallel-serial fashion. Combinatorial processing may be used to test and compare multiple and various processing techniques. The processing techniques may be validated, and those techniques that are useful may be applied to, for example, different substrates or full-substrate processing.

Spin processing may be used to deposit a uniform layer over a substrate or to uniformly distribute a solution over an entire substrate. Therefore, what are needed are techniques for using spin processing techniques within regions of substrates.

BRIEF DESCRIPTION OF THE DRAWINGS

Various embodiments of the invention are disclosed in the following detailed description and the accompanying drawings:

FIGS. 1A-1G illustrate various views of a stirrer having an impeller to agitate a fluid introduced onto a substrate;

DETAILED DESCRIPTION

Figure 1A:
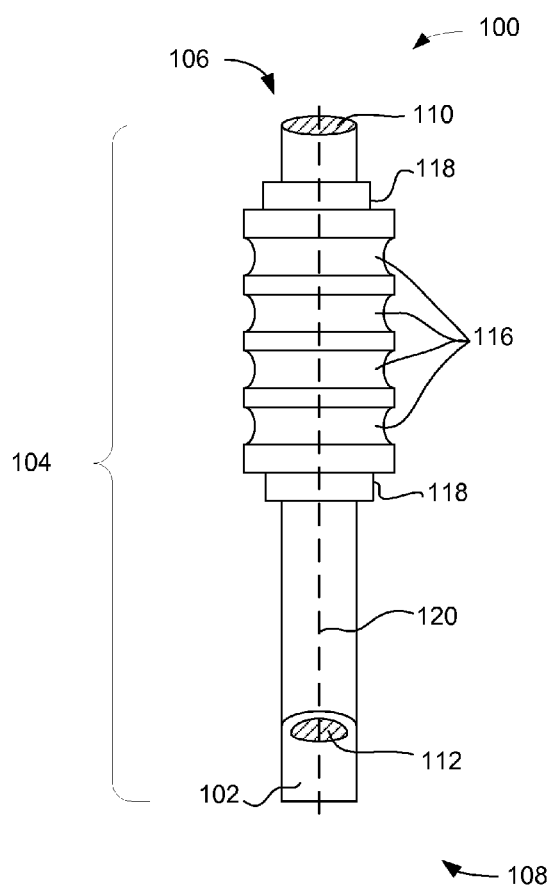

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various examples, a stirrer for use with wet (i.e., aqueous) processes performed in a combinatorial manner is disclosed. The stirrer dispenses fluids onto a substrate and agitates the fluids to mimic the operation of a spin processor. A fluid may be any gas, liquid, or plasma, such as prepared solutions, colloids, suspensions, etc. The stirrer has a body with a first end and a second end. A first aperture is at the first end of the body, and a second aperture is at the second end of the body. The body is hollow such that the first aperture and the second aperture are connected so that when a fluid is introduced into the first aperture, the fluid is dispensed out of the second aperture. For example, the stirrer may be suspended vertically over a substrate or a region of a substrate. When a fluid is introduced into the first aperture, the fluid is dispensed onto the substrate or the region of the substrate underneath the stirrer. An impeller is at the second end of the body, and may be underneath the second aperture such that when a fluid is dispensed from the second aperture, the impeller agitates the fluid. The agitation of the fluid may facilitate interaction of the fluid with the surface of the substrate to improve the kinetics of chemical and/or physical reactions with the substrate surface. According to an example, flow characteristics of the fluid are altered using the impeller, for example by rotating the body. According to other examples, the stirrer is used to mimic a spin processor in a combinatorial manner such that a substrate divided into multiple regions is processed using one or more different processes. The efficacy of those processes can be evaluated and selected processes can be subsequently performed on a larger scale (e.g., a full wafer).

Stirrer for Use in Combinatorial Processing

Combinatorial processing may include any processing (e.g., semiconductor processing) that varies the processing conditions in two or more regions of a substrate. A substrate may be, for example, a silicon substrate such as a wafer that is used in semiconductor processing. A region of a substrate may be any portion of the substrate that is somehow defined, for example by dividing the substrate into regions having predetermined dimensions or by using physical barriers, such as sleeves, over the substrate. The region may or may not be isolated from other regions. For example, a substrate may be divided into two or more regions, each of which may or may not include semiconductor device structures (e.g., metallization such as interconnects and vias, active elements such as transistors, etc.) A process may be performed at each of the regions. For example, a first region is cleaned using a first cleaning agent, and a second region is cleaned using a second cleaning agent. The efficacies of the two cleaning agents are evaluated, and none, one, or both of the cleaning agents may be selected as suitable candidates for larger scale processing (e.g., on regions with structures, regions enabling more sophisticated testing or a full wafer). According to other examples, multiple of the same experiment is performed on the same substrate, and any number of regions may be defined. For example, five cleaning solutions may be tested using fifteen regions of a substrate, each cleaning solution being tested three times.

Certain processes, such as wet processes used in semiconductor processing, may be performed by dispensing fluids onto a substrate and spinning the substrate to distribute the fluid over the surface of the substrate using a spin processor, for example. When combinatorial processing is performed using multiple regions on a single substrate, it may not be possible to spin the substrate to distribute the fluid as in a spin processor. As a result, the combinatorial processing may not be able to adequately simulate these processes. FIGS. 1A-1D illustrate various views of a stirrer 100 having an impeller 102 to agitate a fluid introduced onto a substrate. The stirrer 100 may be used to dispense and spin fluids onto a region of a substrate in such a way that the combinatorial processing more closely or adequately and accurately mimics a spin processor for purposes of the experimentation.

As shown in FIG. 1A, the stirrer 100 includes a body 104 having a first end 106 and a second end 108. As shown here, the body 104 is approximately cylindrical; however it is understood that any shape may be used. A first aperture 110 is at the first end 106, and a second aperture 112 is at the second end 108.

Figure 1B:
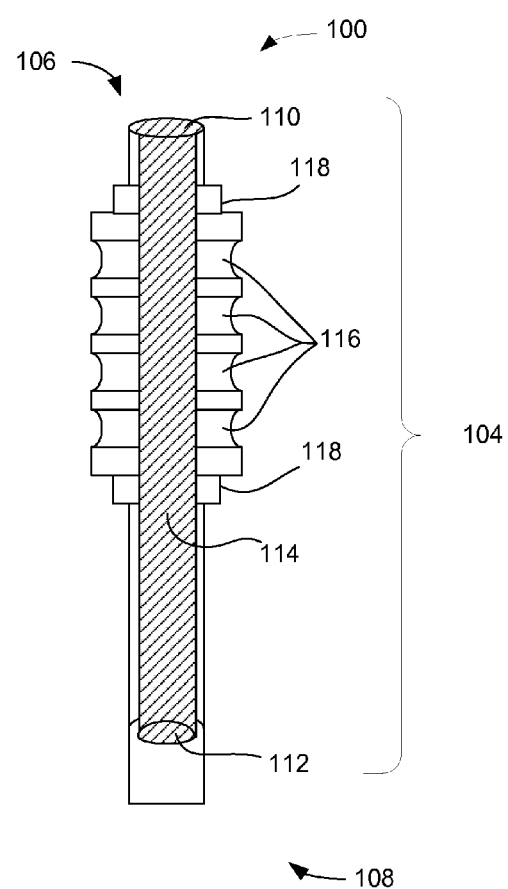
Figure 1C:
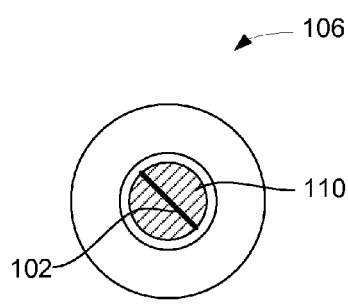

A cutaway view of the stirrer 100 is shown in FIG. 1B, in which it can be seen that the body 104 has a hollow interior 114 connecting the first aperture 110 to the second aperture 112. The hollow interior 114 forms a connection such that when a fluid is introduced into the first aperture 110, the fluid is dispensed out of the second aperture 112 when a force (e.g., gravitational or mechanical) acts upon the fluid. For example, as described regarding FIG. 2A, a dispenser may be inserted into the first aperture 110, a fluid introduced into the stirrer 100, and the fluid dispensed out of the second aperture 112. An overhead view of the first end 106 is shown in FIG. 1C. As shown in FIG. 1C, the impeller 102 can be seen through the hollow interior 114 looking down the first aperture 110.

The stirrer 100 may be made from any appropriate material. For example, the stirrer 100 may be made from poly ether ether ketone (PEEK), polytetrafluoroethelyne (PTFE), other polymers such as ultra high-molecular weight polymers, or coated metals (e.g., aluminum coated with PTFE). PEEK is highly chemically inert, stiff, rigid, and does not cold flow (i.e., does not deform under continuous load at temperatures within its working range). Teflon and other high molecular weight polymers are chemically inert and do not interact with chemicals used in combinatorial processing. The stirrer 100 may be formed by machining, casting, forging, or other techniques. Although specific materials have been described, it is understood that any type of material may be used for the stirrer 100, depending on the requirements of the application in which it is used. For example, certain materials may or may not be compatible with solutions or fluids that are to be used with the stirrer 100. The material of the stirrer 100 can be chosen based on a number of characteristics, including inertness, material compatibility, durability, and cost.

Figure 1D:
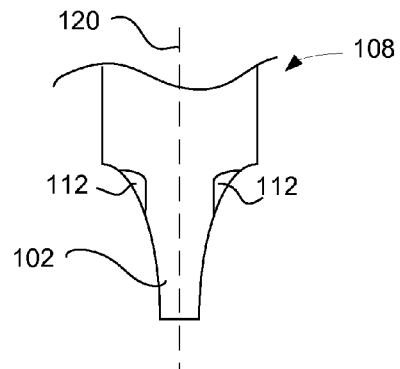

FIG. 1D shows a close-up side view of the impeller 102. The impeller 102 is at the second end 108 near the second aperture 112. According to some examples, the impeller 102 is under the second aperture 112. When the stirrer 100 is rotated, the impeller 102 agitates a fluid dispensed onto a substrate to facilitate interaction of the fluid with the surface of the substrate. The impeller 102 allows a combinatorial process performed in regions of a substrate to mimic a spin processor according to various examples. For example, the impeller 102 distributes the fluid throughout a region onto which a fluid is dispensed. When the fluid is dispensed out of the second aperture 112, the fluid collides with the impeller 102, which is rotating, and the collision dispenses the fluid throughout the region. The fluid flow characteristics caused by the agitation (e.g., the rotation) provides results similar to those using a full spin processor.

Figure 2A:
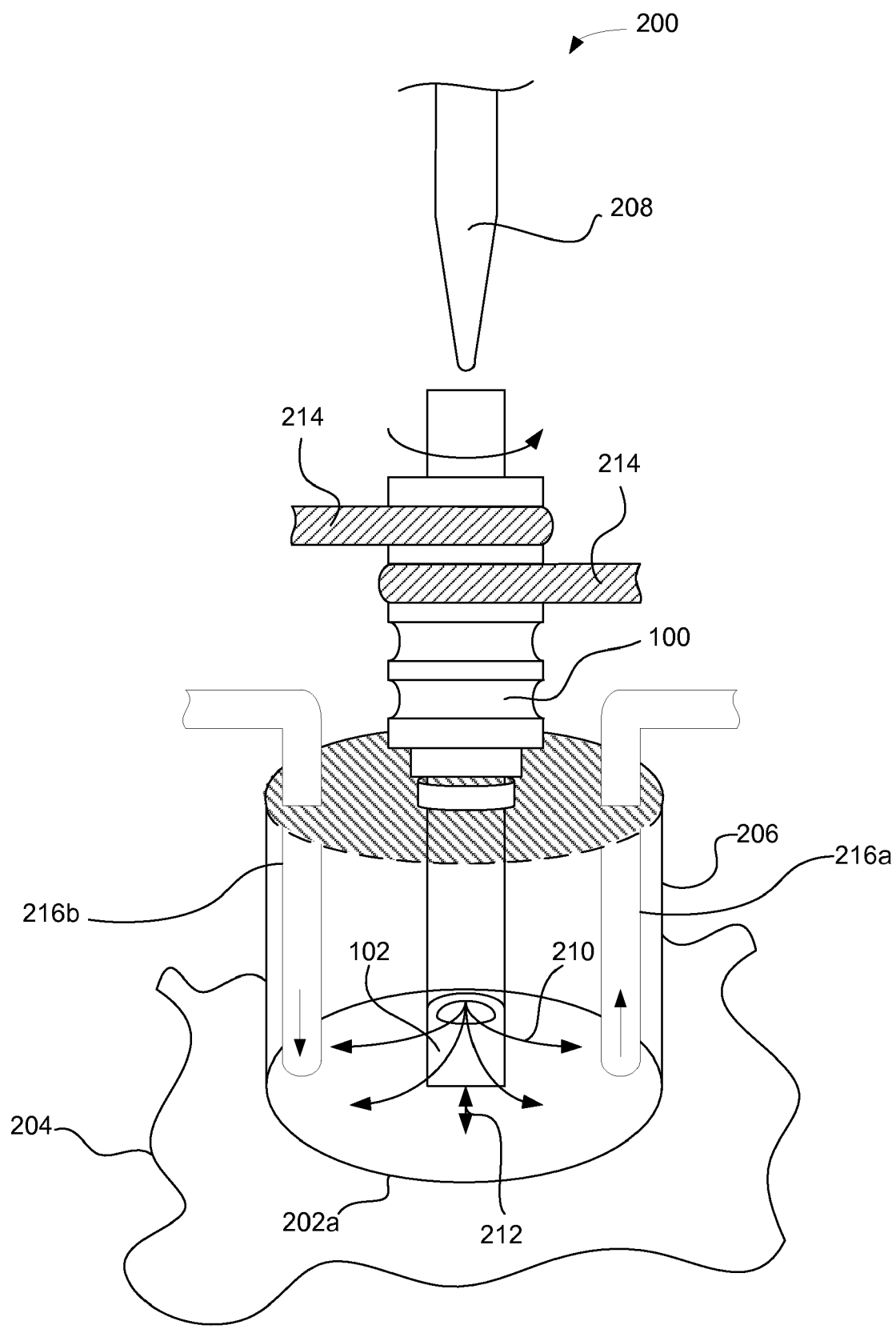
FIG. 2A illustrates a stirrer performing a combinatorial process in a region of a substrate.
Figure 3A:
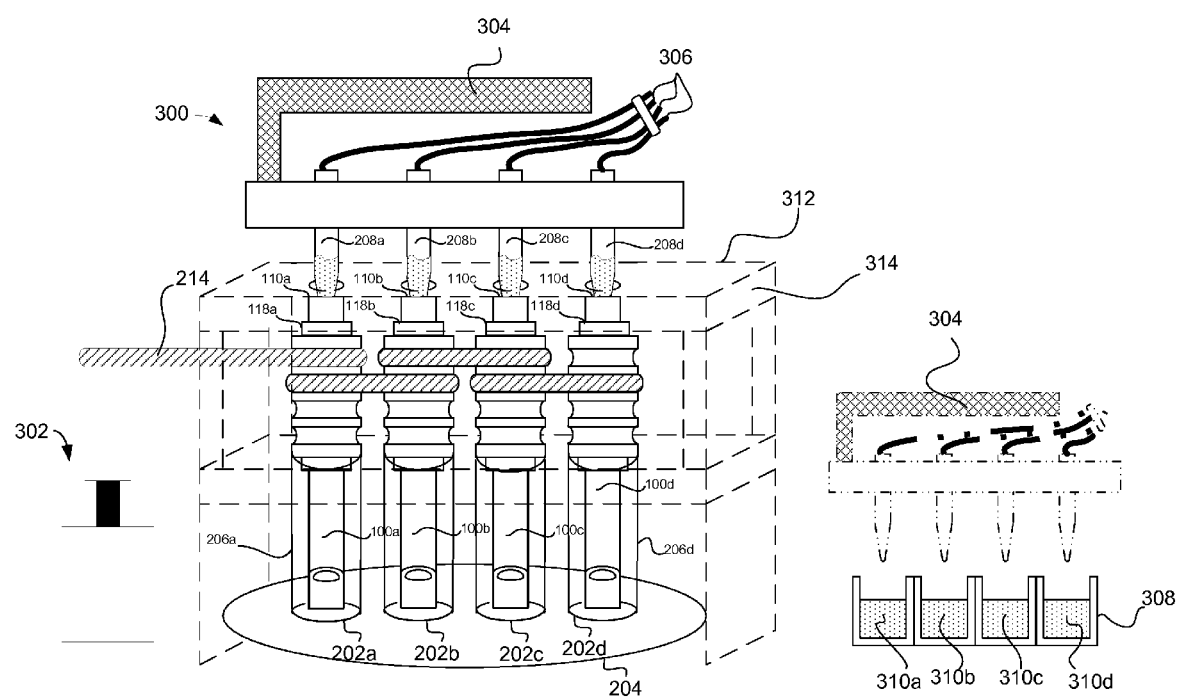
FIG. 3A illustrates a tool including several stirrers for processing multiple regions in a combinatorial manner.
Figure 3B:
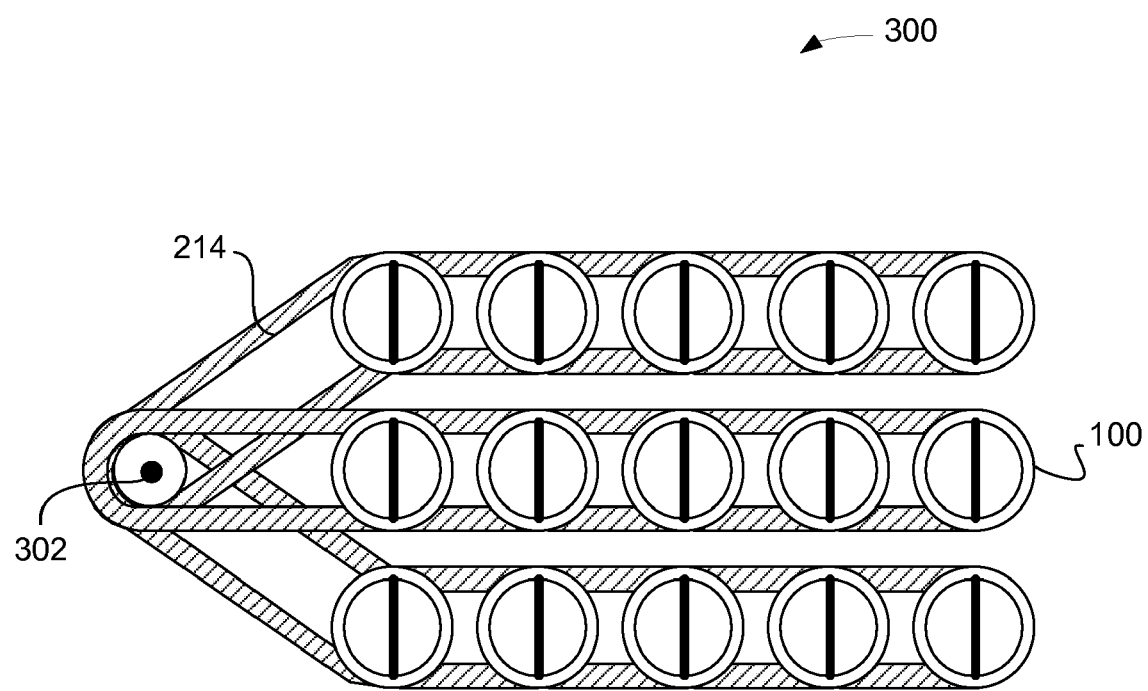
FIG. 3B illustrates an overhead view of the tool according to an example.

Returning to FIG. 1A, according to an example, the stirrer 100 is rotated using grooves 116. The grooves 116 may be configured to accept belts such that the stirrer 100 rotates when the belts move. The belts may be motivated by an electric or other type of motor, and other motivation systems are possible. Collars 118 may attach to bearings in a frame, which allow the stirrer 100 to rotate smoothly. FIGS. 2A and 3A-3B illustrate the rotation of the stirrer 100, as well as a frame for housing the stirrer 100 in greater detail. Although a belt and pulley system are shown here, it is understood that other motivation systems, such as gear drive, direct drive (e.g., a motor attached to the stirrer 100), or magnetic drive systems (e.g., the magnetic stirring system of FIG. 6A-6D), may also be used.

Figure 8:
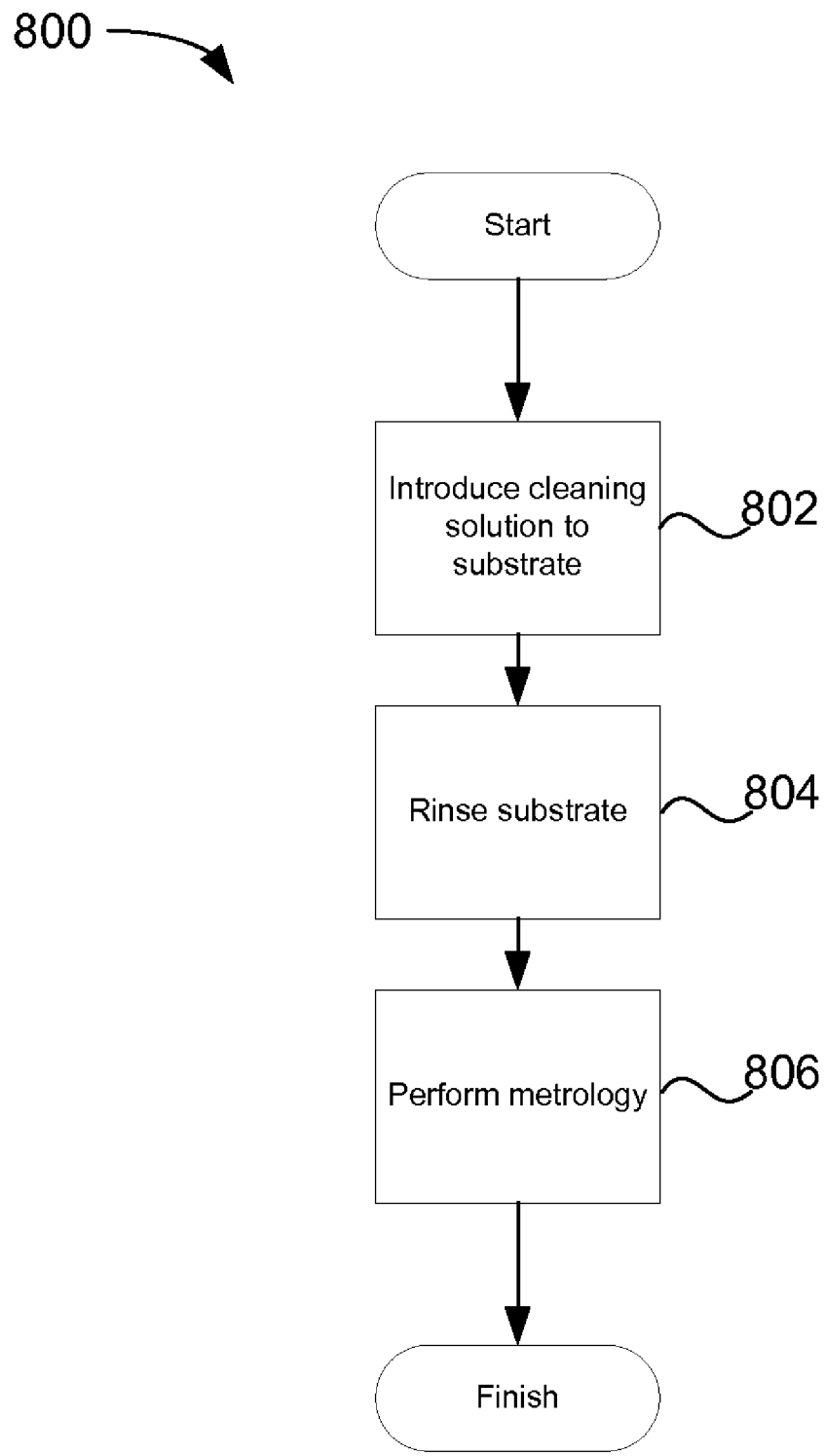
FIG. 8 is a flowchart describing a process for performing a clean operation using combinatorial processing with a stirrer according to various examples.

According to an example, fluid is introduced into the first aperture 110 as part of a combinatorial process. For example, the combinatorial process may be a post-chemical mechanical planarization (CMP) clean process that may be configured to operate on a spin processor. Using a spin processor, for example, the chemical cleaning agents are dispensed onto a center of a substrate, which is then rotated to dispense the agents over the entire surface of the substrate using centrifugal force. The impeller 102 agitates the fluid as it is dispensed onto the substrate, mimicking a spin processor and enabling the cleaning process to work during combinatorial processing. Once a combinatorial process has been validated, the process may be repeated on more complex substrates or using full-scale integration. FIG. 8 is a flowchart describing a process for performing a clean using a stirrer such the stirrer 100 with combinatorial processing in more detail.

The impeller 102 is shown having an approximately flat and square shape, similar to a flathead screwdriver. Additionally, the impeller 102 is shown being aligned with an axis 120 parallel to a length of the body 104. It is understood that various other shapes, locations, and configurations may be used with the impeller 102, including symmetrical and asymmetrical designs. For example, other impeller designs are shown in FIGS. 4A-4E.

Figure 1E:
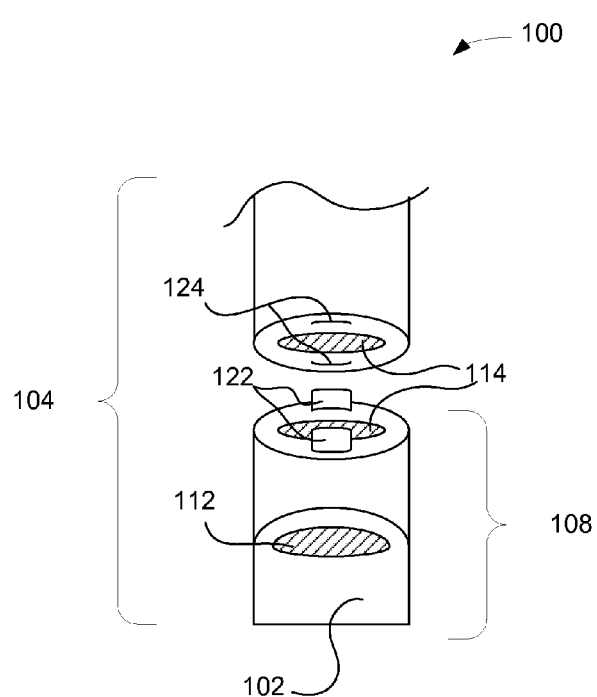

Additionally, the impeller 102 may be detachable. For example, as shown in FIG. 1E, the second end 108 of the body 104 is detachable. When the second end 108 is inserted into the remainder of the body 104, the second end 108 is retained using a retention mechanism such as tabs 122, which can be inserted into slots 124. It is understood that various other retention mechanisms (see, e.g., FIG. 1F) may be used. With a detachable impeller, the impeller 102 may be easily exchanged for impellers of other designs to allow for further experimentation.

As shown in FIGS. 1F and 1G, the impeller 102 is configured to have adjustable downforce and/or adjustable height. FIG. 1F shows a detachable impeller 102 with a brush 124 attached. The brush 124 may be used to enhance cleaning processes; the brush 124 is explained further regarding FIGS. 2D, 5A and 5B. In some embodiments, the brush 124 may be considered the impeller 102.

As shown here, the body 104 includes a shaft 126 that protrudes from the body 104 and includes two ribs 128. The shaft 126 may be inserted into the hollow interior 114 portion of the second end 108 of the body 104, and either of the ribs 128 may interlock with the complementary rib 130 inside the second end 108. The height of the impeller 102 and/or the brush 124 can be adjusted by inserting the shaft 126 into the second end 108 such that one of the ribs 128 engages with the rib 130. For example, if the rib 128b engages with the rib 130, the brush 124 has a greater height over the substrate than if the rib 128a engages with the rib 130. The brush 124 may thus be adjusted to be higher (i.e., have less downforce) by engaging the rib 128b, and to be lower (i.e., have more downforce) by engaging the rib 128a.

FIG. 1G illustrates another way to adjust the height of the brush 124 over the substrate. The stirrer 100, as shown in FIG. 1G, includes a spring 132. The tension of the spring (i.e., the spring constant) may be selected such that a desired amount of downforce or height above the substrate is realized. For example, a spring with a higher spring constant provides greater downforce on and less height over the substrate.

Other techniques for adjusting the downforce and height are possible. For example, the shaft 126 and the second end 108 may include complementary screw threads. The second end 108 can then be screwed up to increase height and reduce downforce, and screwed down to reduce height and increase downforce. Other techniques may include pneumatic cylinders or electromechanical devices to adjust the height of the stirrer 108, for example.

Stirrer in a Site-Isolated Cell

FIG. 2A illustrates the stirrer 100 performing a combinatorial process in a region 202a of a substrate 204. The substrate 204 may be divided into multiple regions 202 (e.g., the regions 202a ... 202n) of any design or size, for example. The stirrer 100 may be one of several stirrers, each processing one of the regions 202 of the substrate 204 (see FIG. 3A). The regions 202 may be site isolated so that different processes may be performed in each of the multiple regions 202 without contaminating or interfering with other processes. For example, the regions 202 may be isolated using a sleeve that creates a site-isolated cell 206. When fluids, such as solutions including various chemistries, are introduced to the region 202a, for example, the fluids are limited to interacting with the region 202a, and therefore when using multiple regions 202, multiple processes may be performed in a combinatorial manner. More details about site-isolated combinatorial processing may be found in U.S. patent application Ser. No. 11/352,077 entitled "Methods for Discretized Processing and Process Sequence Integration of Regions of a Substrate" and filed Feb. 10, 2006. Other examples may not include site isolation.

Fluid can be introduced into the first aperture 110 using a dispenser 208. The dispenser 208 is attached to a support arm (see FIG. 3A) that can be lowered into the first aperture 110, and the fluid is dispensed and therefore introduced into the first aperture 110. When the fluid is introduced, it is then dispensed out of the second aperture 112, as indicated by flow 210. The stirrer 100 rotates such that the fluid is distributed and spun on the region 202a to mimic a spin processor. The fluid is agitated by the impeller 102 to facilitate interaction of the fluid with the surface of the substrate 204. The impeller 102 may also alter the flow 210 to facilitate the interaction. The agitation therefore improves the surface chemistry of the process. As described regarding FIGS. 1F and 1G, the stirrer 100 (and therefore the impeller 102) may also be height adjustable 212 relative to the substrate 204.

Belts 214 may be used to rotate the stirrer 100. The belts 214 fit into the grooves 116 and are attached to a motor (see FIG. 3A) to rotate the belts 214 as in a belt and pulley system. The belts 214, according to some examples, have either transverse or longitudinal ribs on the interior of the belts 214 to prevent belt slippage. Additionally, the belts are made from any appropriate material, such as rubber, plastics, or other synthetic materials, and may or may not have reinforcements such as steel threads. Alternatively, chains or other motivation systems can be used.

Distribution lines 216 may also be used to introduce fluids and materials and remove fluids and materials to and from the cell 206. For example, a vacuum line 216a is used to remove fluids after they are dispensed from the second aperture 112. A feed line 216b is used to introduce nitrogen ($N_2$) gas or water (e.g., deionized water) into the cell 206. As explained regarding FIG. 2C, the distribution lines 216 may affect the flow 210 of the fluid introduced using the stirrer 100 once the fluid is in the cell 206.

Figure 2B:
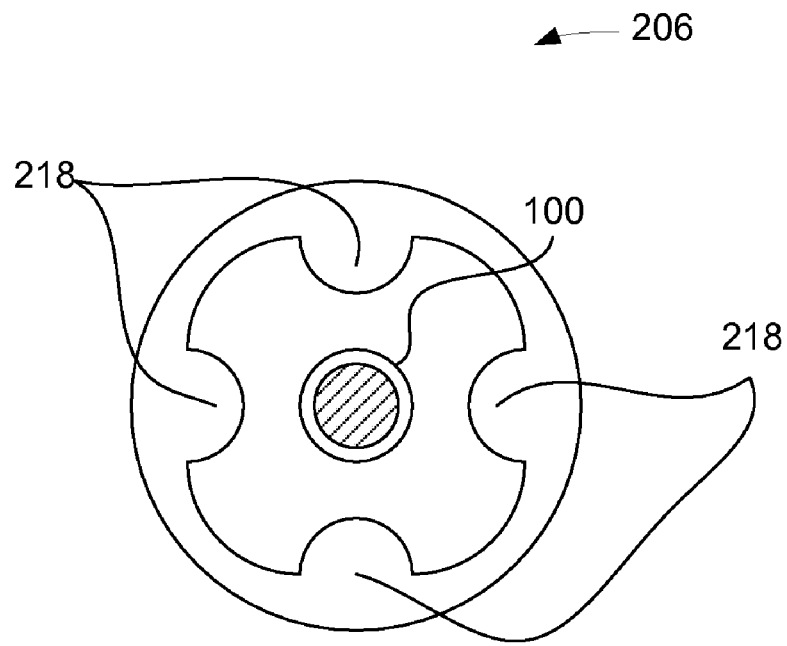
FIG. 2B illustrates a cross-sectional view of the cell including baffles according to an example.

The stirrer may be inserted into a cell that includes baffles. FIG. 2B illustrates a cross-sectional view of the cell 206 including baffles 218 according to an example. When the stirrer 100 is rotating, the fluid dispensed from the stirrer 100 may cavitate, causing poor flow characteristics. The baffles 218 are included to alter the flow 210. The baffles 218 may cause the fluid to deflect, breaking up the cavitated flow and improving flow characteristics. As shown in FIG. 2B, the baffles 218 are approximately evenly spaced and include four straight baffles. However, other designs, including more or fewer baffles, wider or narrower baffles, and baffles having different shapes may be included.

Figure 2C:
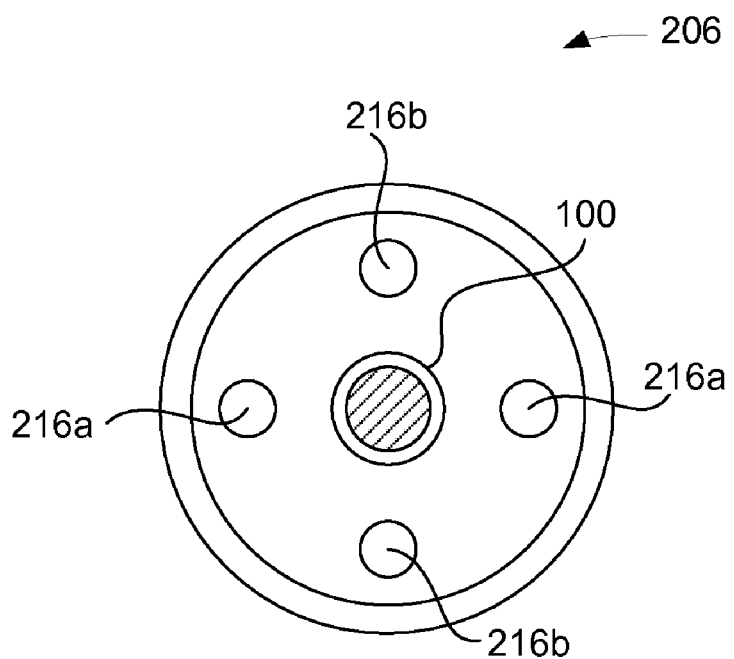
FIG. 2C illustrates a cross-sectional view of the cell showing distribution lines according to an example.

FIG. 2C illustrates a cross-sectional view of the cell 206 showing the distribution lines 216 according to an example. The distribution lines 216 may also alter the flow 210 by reducing or eliminating cavitation. The distribution lines 216 are shown arranged symmetrically around the cell 206, however, it is understood that any arrangement can be used. Additionally, four distribution lines 216 are shown; however, any number may be used, and any configuration of distribution lines may be used.

Figure 2D:
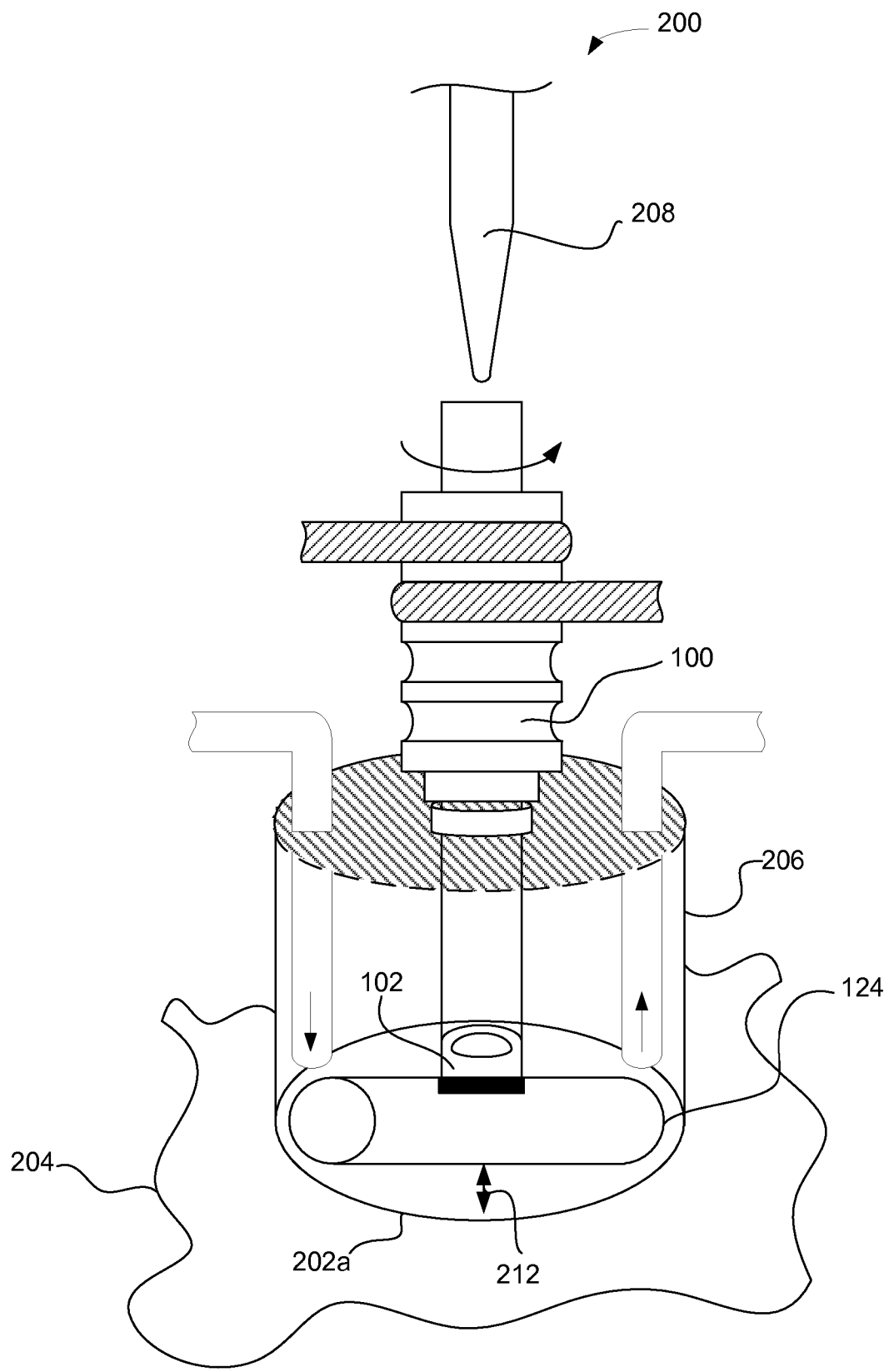
FIG. 2D illustrates a stirrer with a brush attached to the second end of the stirrer in a cell according to an example.

FIG. 2D illustrates the stirrer 100 with the brush 124 attached to the second end 108 of the stirrer 100 in the cell 206 according to an example. The brush 124 is discussed in more detail regarding FIGS. 5A and 5B. As shown here, the brush 124 is substantially as wide as the region 202a and therefore the cell 206. However, it is understood that the brush 124 may have any size and configuration. The brush 124 may also be in contact with the substrate 204, or may hover above the substrate 204. Certain processes, such as clean processes, can be assisted using the brush 124.

Figure 2E:
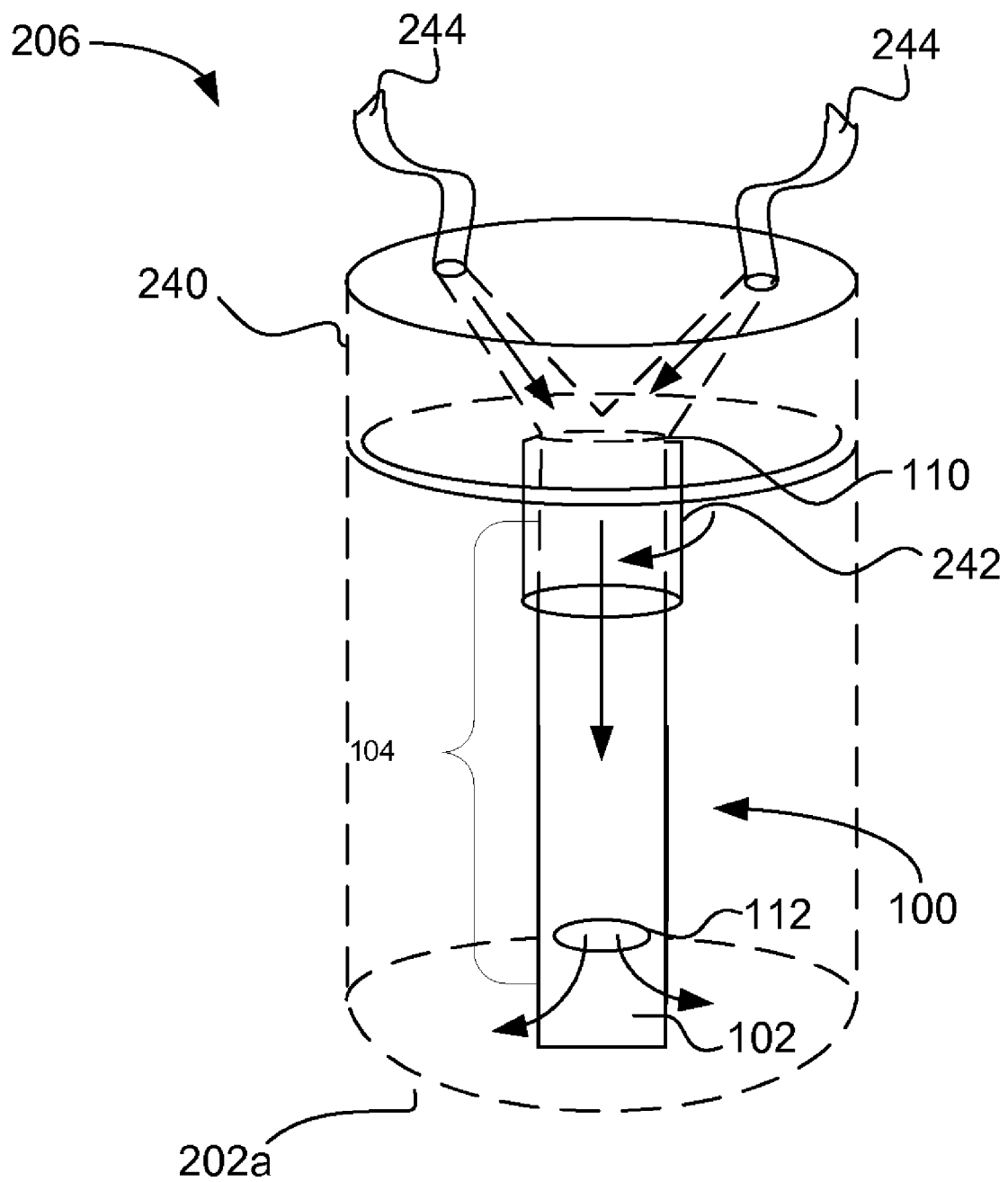
FIG. 2E illustrates the site isolated cell using a flow cell to distribute fluids into the region.

FIG. 2E illustrates the cell 206 using a flow cell 240 to distribute fluids into the region 202a. The flow cell 240 introduces fluids from above the stirrer 100 and into the first aperture 110. The fluids are then dispensed out of the second aperture 112 and onto the region 202a. The stirrer 100 may be rotated using a drive system 242 such as a motor (electric or otherwise) or a belt and pulley system such as the one described above. Alternatively, the drive system 242 is located elsewhere. As described above, the rotation of the stirrer 100, when used with the flow cell 240, may improve the surface chemistry in the region 202a.

The flow cell 240 includes one or more feed lines 244 that provide solutions and other fluids for the region 202a. The fluids are prepared using other components, such as mixers and manifolds that are attached to the feed lines 244. As with the other examples described here, the flow cell 240 is one of many flow cells operating on one of multiple regions 202. The flow cell 240 can therefore be used in combinatorial processing to validate various experiments. For example, the flow cell 240 dispenses one solution onto the region 202a, while another flow cell dispenses another solution onto the region 202b. The results of the dispensing are compared, the efficacies of the solutions determined, and none, one or both of the solutions may be used with full substrate processing.

Combinatorial Processing

FIG. 3A illustrates a tool 300 including several stirrers 100a-100d for processing multiple regions 202 in a combinatorial manner. Four stirrers 100a-100d are shown here, which are collectively referred to as the stirrers 100. The stirrers 100 are rotated using a drive system such as a motor 302 attached to the bands 214, which are used to rotate the stirrers 100 simultaneously. The dispensers 208 are attached to a support arm 304 that moves the dispensers 208 into and out of the first apertures 110. The dispensers 208 are also attached to lines 306 that are used to draw fluid into the dispensers 208 and expel fluid from the dispensers 208. Additionally, the support arm 304 may move the dispensers 208 into reservoirs 308 from which fluids 310 are obtained for the combinatorial processing.

During combinatorial processing, uniform processing may be enabled across the multiple regions. For example, the dispensers 208a, 208b, 208c, and 208d each obtain a fluid (e.g., a solution) 310a, 310b, 310c, and 310d, respectively, having a different composition. The various fluids 310 are introduced into the stirrers 100, and dispensed into the regions 202a, 202b, 202c, and 202d. Multiple experiments are therefore simultaneously run, such that tests of different solutions and chemistries are performed and analyzed. Once the various experiments have been run, each of the multiple regions 202 are examined or tested, for example by using various metrologies such as electronic testing (e-testing) including capacitance and resistance testing, and microscopy including scanning electron microscope (SEM) images, transmission electron microscope (TEM) images, and atomic force microscope (AFM) images. Once a particular formulation has been validated through testing, the compositions may be adapted to a full substrate.

Various techniques may be used to introduce the fluids 310 into the regions 202. According to one example, a predetermined amount of fluid, for example 1 ml, is dispensed onto the substrate 204. The predetermined amount of fluid is drawn into the dispenser 208 and introduced into the first aperture 110, which then causes the fluid to be dispensed onto the region 202. According to another example, the fluid is continuously dispensed into the region 202 and continuously removed. For example, the dispenser 208 introduces the fluid at a predetermined rate into the first aperture 110. The vacuum line 216 removes the fluid from the region 202, and the process continues for a predetermined amount of time. The dispensing and removal of a fluid for a predetermined amount of time may result in a choked flow through the region.

The tool 300, including the stirrers 100, is housed in a frame 312. The frame 312 may be made of any material, for example a plastic or metal, and may have any configuration. The frame 312 may be designed such that the stirrers 100 are held in any position, for example an approximately vertical position, and may include bearings, for example, to engage with the collars 118a-118d. The tool 300 may further include other elements such as a chuck to hold the substrate 204. Additionally, an upper plate 314 of the frame 312 may be removable, and the stirrers 100 are mounted in (i.e., attached to) the upper plate 314. In this way, the stirrers 100 can be installed and removed as a unit. Additional and alternative configurations of and details of and relating to the frame 312 and the tool 300 can be found in U.S. patent application Ser. No. 11/352,077 entitled "Methods for Discretized Processing and Process Sequence Integration of Regions of a Substrate" and filed Feb. 10, 2006.

FIG. 3B illustrates an overhead view of the tool 300 according to an example. The tool 300 may include any number of stirrers 100 and/or cells 206. Additionally, the cells 206 may be configured in any manner and the drive mechanism to rotate the stirrers 100 may be configured in any way. Alternatively, other types of drive mechanisms, such as mechanical (e.g., gear driven) or magnetic drive can be used.

Other Impeller Designs

Figures 4A, 4B, 4C, 4D, 4E:
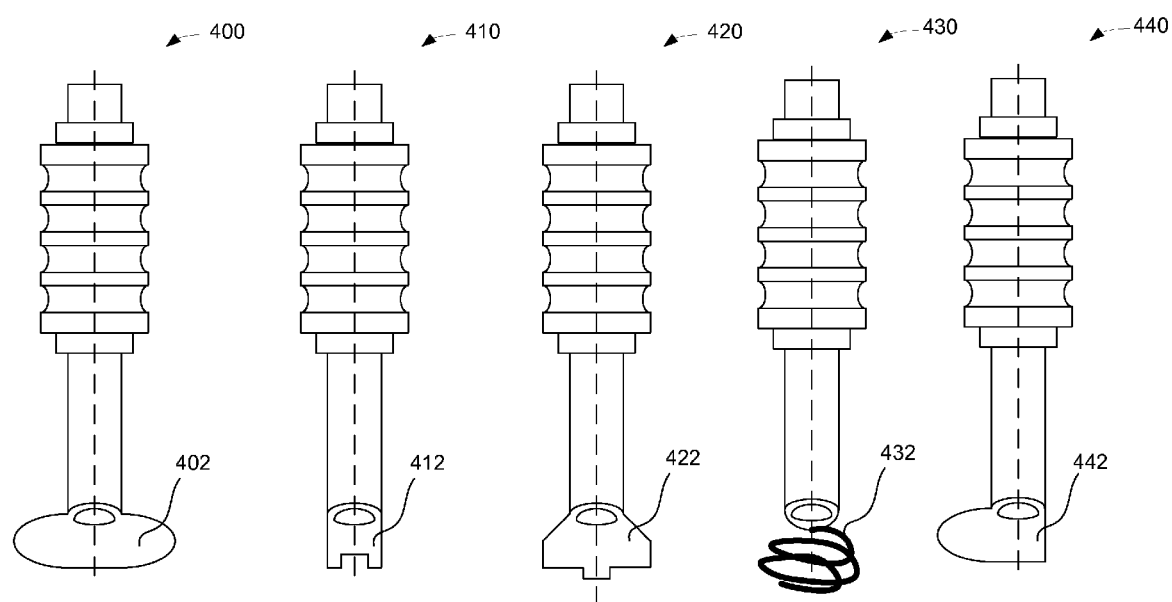
FIGS. 4A-4E illustrate other impeller designs according to various examples.

FIG. 4A illustrates a stirrer 400 having an impeller 402 shaped like a propeller. The impeller 402 may alter the flow characteristics of fluids dispensed out of the stirrer 400. For example, the fluids are dispensed more heavily toward the perimeter of a region of a substrate. The impeller 402 may be useful with certain processes, for example, where a fluid is viscous and does not distribute easily.

FIG. 4B illustrates a stirrer 410 having an impeller 412 including two prongs 414 that are used to attach a brush (e.g., the brush 124) to a second end of the stirrer 410. FIG. 4C illustrates a stirrer 420 having an impeller 422 with a large head and a notch at the end. The impeller 422 may also be used to attach a brush (e.g., the brush 124).

FIG. 4D illustrates a stirrer 430 having an impeller 432 having a corkscrew shape. The impeller 432 can be used to provide a different type of agitation of fluids. For example, the impeller 432 froths a fluid before it is dispensed onto the substrate. This characteristic may be useful with certain processes.

FIG. 4E illustrates a stirrer 440 having an asymmetrical impeller 442. The impeller 442 is similar in shape to the propeller-shaped impeller 402 of the stirrer 400, but only has one protrusion from the stirrer 440. Any impeller shape may be asymmetrical, and an impeller may include one or more shapes. For example, an impeller could have the propeller shape of the impeller 402 on one side, and the notch shape of the impeller 422 on the other side. Additionally, an impeller could have more than two protrusions, for example, three or four protrusions from the stirrer.

Surface Brush

Figure 5A:
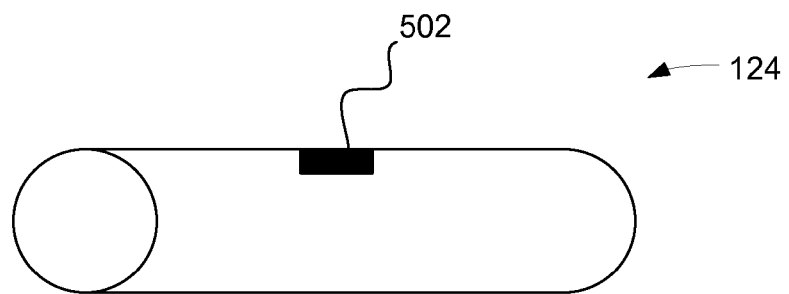
FIGS. 5A and 5B illustrate a brush that may be used to clean a substrate according to various examples.
Figure 5B:
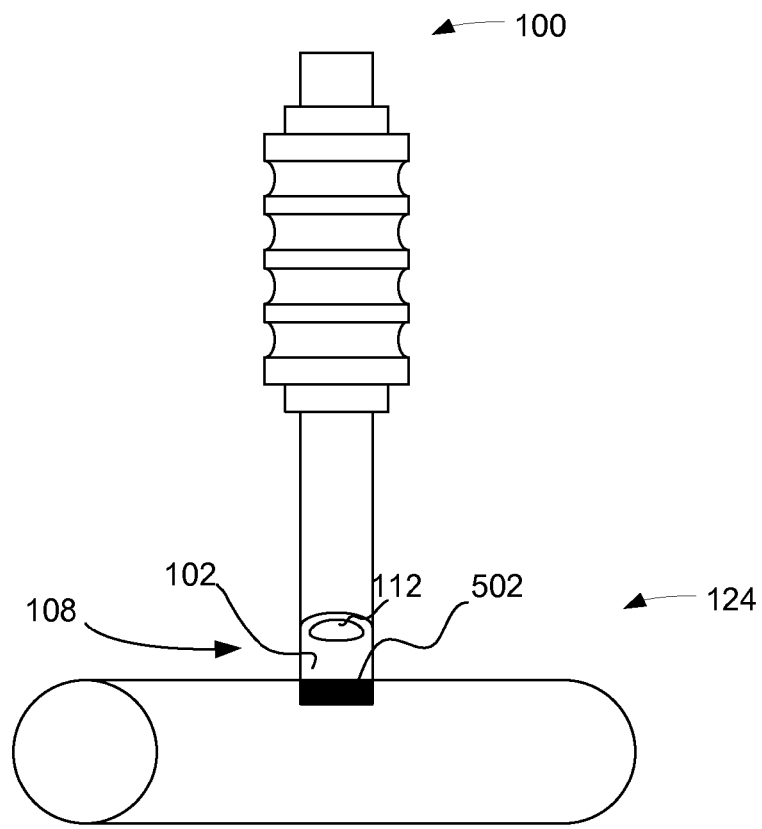

FIGS. 5A and 5B illustrate the brush 124 that may be used to clean a substrate according to various examples. The brush 124 may be made of polyvinyl alcohol (PVA) or other materials such as other polymers, plastics, natural materials, etc. The brush 124 can be made from any grade of PVA having any porosity, and the PVA may or may not be cross-linked. The brush 124 may have a cylindrical shape as shown in FIG. 5A or may have any other shape, and may or may not have nubs or other features to assist with cleaning.

The brush 124 also has a slot 502 that is configured to accept the impeller 102. As shown in FIG. 5B, the impeller 102 is inserted into the slot 502 so that the brush 124 is mounted onto the second end 108 of the stirrer 100. The impeller 102 may have a design adapted to interface with the slot 502, such as the impeller 412 shown in FIG. 4B or the impeller 422 shown in FIG. 4C.

As is described further regarding FIG. 2A, the stirrer 100 may be height adjustable relative to a substrate so that the brush 124 can be moved into or out of contact with the substrate 204. To clean the substrate, for example, the brush 124 may be lowered onto the substrate 204 and rotated. A fluid is dispensed from the second aperture 112 of the stirrer 100, and spread about the substrate 204 using the brush 124. The brush 124 promotes thorough application of the fluid to the substrate 204, for example.

According to another example, the brush 124 is not in contact with the substrate 204 that it is cleaning. The brush 124 may be some height 212 above the substrate 204 and employ contactless cleaning, where the force of rotation or static electricity cause the fluid to interact with the surface.

Although cleaning is described here, it is understood that various other processes, such as deposition, may be performed or assisted using the brush 124 or other similar attachments.

Chemical Mechanical Planarization

Figure 5C:
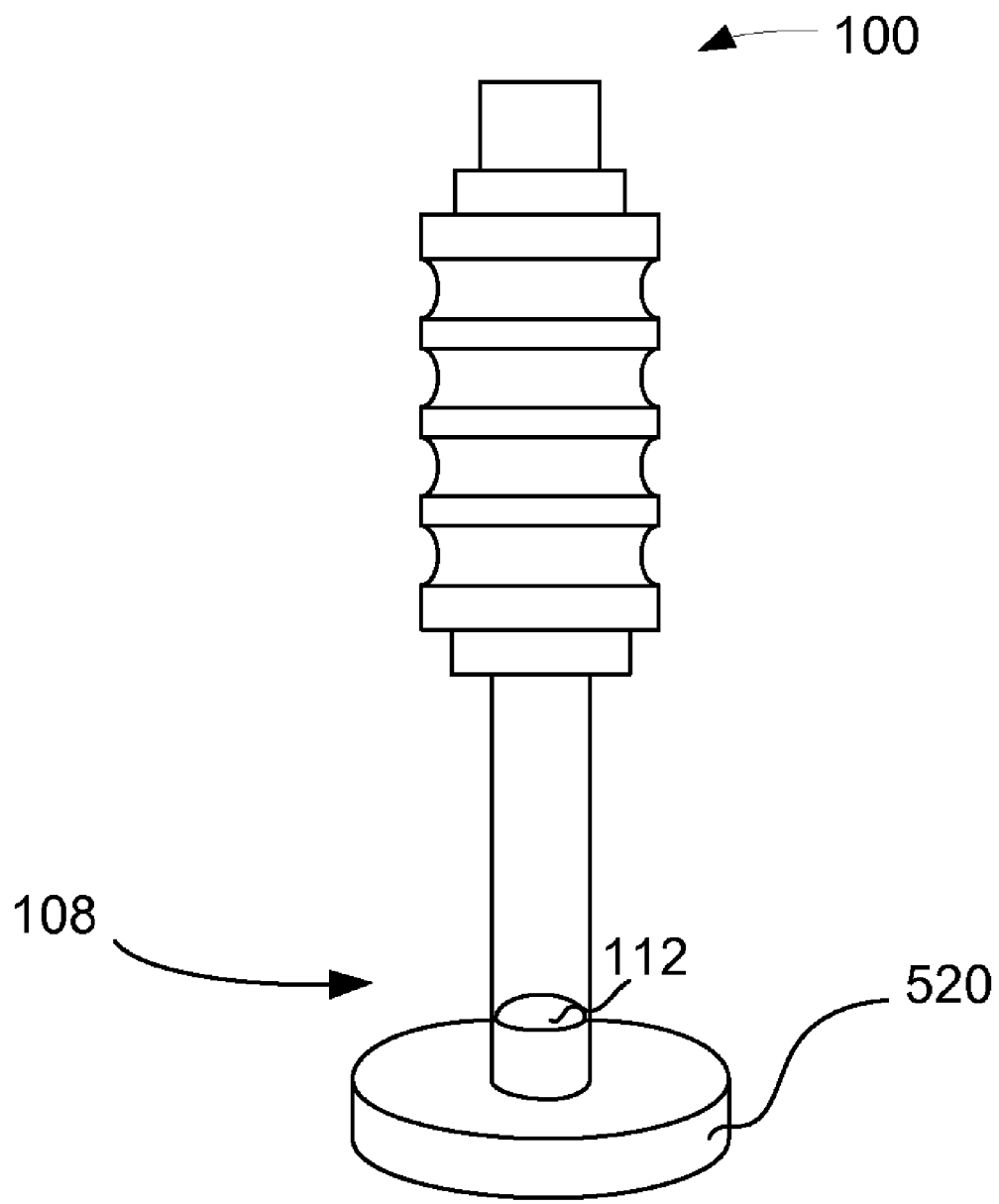
FIG. 5C illustrates the stirrer including a chemical mechanical planarization (CMP) pad attached to the second end of the stir.

FIG. 5C illustrates the stirrer 100 including a chemical mechanical planarization (CMP) pad 520 attached to the second end 108. The CMP pad 520 may be used to implement combinatorial CMP in multiple regions 202, for example. A CMP slurry (i.e., a fluid) is introduced into the first aperture 110, and then dispensed out of the second aperture 112 onto the substrate 204. The stirrer 100 is then rotated to perform polishing for the CMP. According to an example, the CMP pad 520 may also or alternatively include a hole beneath the second aperture 112, out of which the slurry can be dispensed. The CMP pad 520 may be considered an impeller according to certain examples.

The CMP slurry may be a silica-, ceria-, or alumina-based slurry, for example. Various mixtures and weights of slurries may be used in a single combinatorial processing scheme, for example. The CMP pad 520 includes a pad (e.g., a polyurethane or other polymer) having abrasives such as silica, ceria, or alumina particles. The CMP pad 520 is rotated at any speed and for any time as needed by a CMP process.

The CMP pad 520 may be any size, and may be located inside the cell 206. The CMP pad 520 may be raised or lowered by adjusting the height 212 using the height adjustment mechanism. The down force between the pad 520 and the surface may also be adjusted by various mechanisms, such as those shown in FIGS. 1F and 1G.

Magnetic Stirring

Figure 6A:
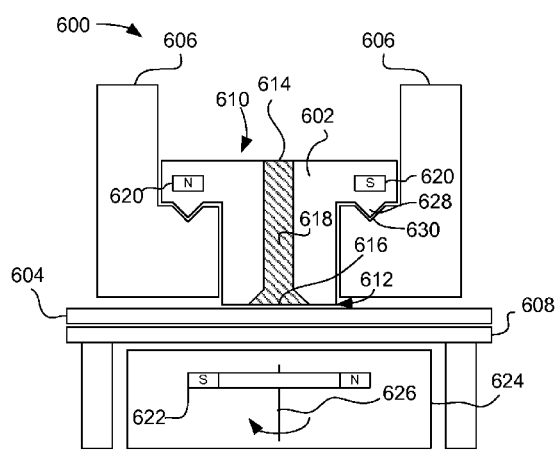
FIGS. 6A-6D illustrate a magnetic stirring system according to various examples.

FIG. 6A illustrates a magnetic stirring system 600 having a stirrer 602 above a substrate 604. As shown in FIG. 6A, a stirrer 602 is within a site isolated cell 606 that may be used with combinatorial processing. For example, a substrate 604 may be divided into multiple regions, one of which is isolated by the site isolated cell 606. The substrate 604 is held by a chuck 608, which may be any type of wafer chuck, such as a mechanical, magnetic, or electrostatic chuck. The stirrer 602 has a first end 610 and a second end 612, at which are a first aperture 614 and a second aperture 616, respectively. The first aperture 614 and the second aperture 616 are connected by a hollow interior 618 of the stirrer 600 such that when a fluid is introduced into the first aperture 614, the fluid is dispensed out of the second aperture 616 and onto the substrate 604.

The stirrer 600 includes magnets 620, which are used to provide motivation for the stirrer 600. Any number of magnets 620 may be used, as shown in a perspective view of the stirrer 602 in FIG. 6D. Another magnet 622 is rotatably mounted within an enclosure 624 beneath the chuck 608. According to an example, the magnets 620 have their polarities arranged such that the movement of the magnet 622 causes the stirrer 602 to rotate. The magnet 622 is rotated by a spindle 626 that is motivated by, for example, an electric or other type of motor. As another example, the spindle 626 is rotated using a belt and pulley system such as the system shown in FIG. 3A. The stirrer 602 may also optionally include a rail 628 that fits into a groove 630 of the cell 606, assisting the rotation of the stirrer 600.

Figure 6B:
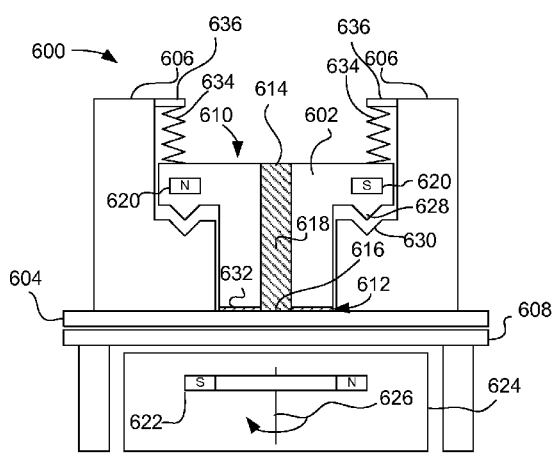
Figure 6C:
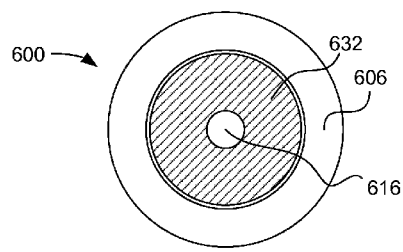

FIG. 6B illustrates the magnetic stirring system 600 with the stirrer 602 having a brush 632 in contact with the substrate 604. As shown in FIG. 6B, the substrate 604 is in contact with the stirrer 602, supporting the stirrer 602. Additionally, the contact may move the rail 628 out of and above the groove 630. The contact with the substrate 604 may aid in brushing the substrate 604. For example, a cleaning agent is introduced into the first aperture 614, and dispensed out of the second aperture 616. The rotation of the stirrer 602 causes the cleaning agent to be dispersed onto the substrate 604, and the brush 632 agitates the cleaning agent. As described above regarding FIGS. 5A-5B, the brush 632 is made of any appropriate material such as PVA, and may have features, such as nubs, to assist in the brushing. FIG. 6C is an underside view of the stirrer 602 with the brush 632. As shown in FIG. 6C, the brush 632 covers the bottom of the stirrer 602, and includes a hole for the second aperture 616. Other configurations of the brush 632 are possible; the brush may be larger or smaller, and may have various textures, for example.

The downforce and height of the stirrer 602 may be adjustable. For example, one or more springs 634 are used to press the stirrer 602 against the substrate 604. The springs 634 are attached to mounts 636, for example, that are rotatable within the cell 606 to allow the springs 634 to rotate with the stirrer 602. The springs 634 are chosen to provide an appropriate amount of downforce, for example by selecting a spring having a desired spring constant. The springs 634 may, in some embodiments, be configured to allow the stirrer 602 to rotate while the springs 634 and mounts 636 remain stationary. For example, the springs may travel in a groove within the top of the stirrer 602 while the stirrer 602 is rotating. Other techniques may be used to press the stirrer 602 against the substrate 604. For example, adjustable screws may be used to change the height or downforce of the stirrer 602 relative to the substrate 604.

Figure 6D:
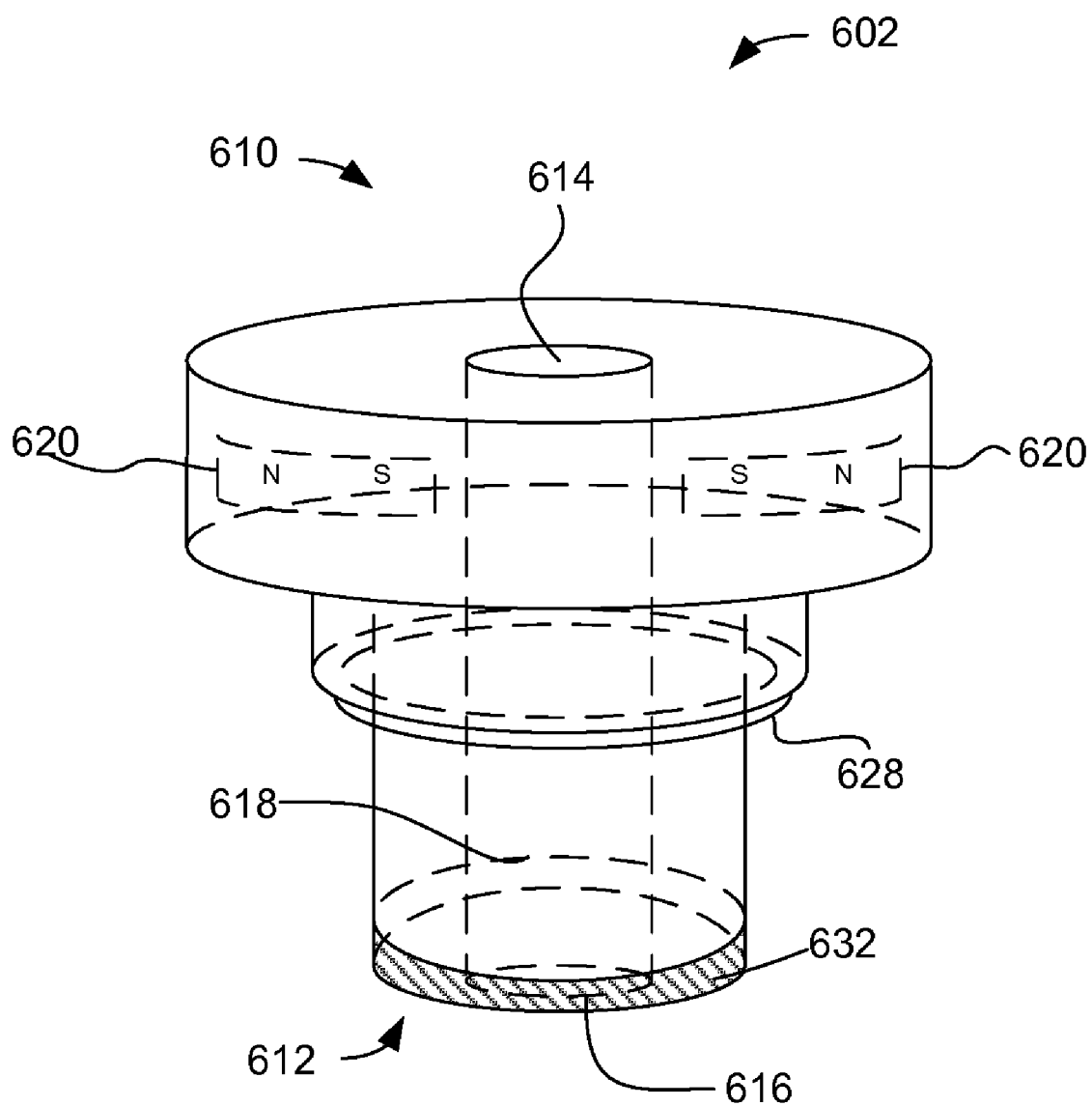

FIG. 6D is a perspective view of the stirrer 602 showing one possible configuration of the stirrer 602. The magnets 620 may be arranged in any configuration and any number throughout the stirrer 602 to provide motivation when the magnet 622 is rotated.

Process for Combinatorial Processing Using a Stir

Figure 7:
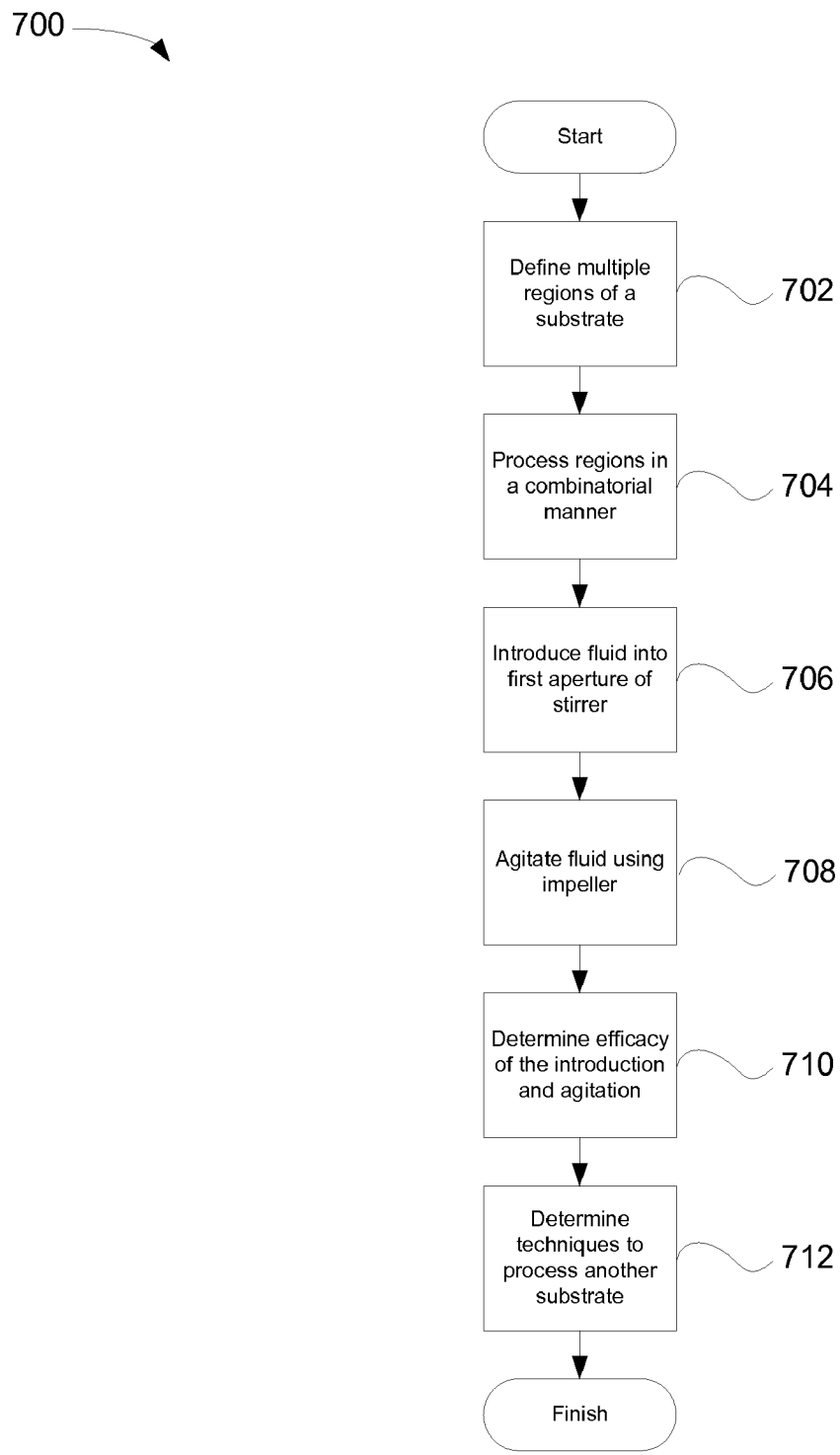
FIG. 7 is a flowchart describing a process for processing multiple regions of a substrate in a combinatorial manner using a stirrer according to various examples.

FIG. 7 is a flowchart describing a process 700 for processing multiple regions of a substrate in a combinatorial manner using a stirrer according to various examples.

In operation 702, multiple regions of a substrate are defined. The multiple regions are, for example, the regions 202 described above. The regions may include structures on which combinatorial processing is to be performed. For example, the regions include dielectric and conductive regions (e.g., metallization), deposited metals, and areas that have been planarized. The regions may be predefined, and a substrate may include any number of regions.

In operation 704, the multiple regions are processed in a combinatorial manner. The processing may include preparing the regions for combinatorial processing, or actual combinatorial processing such as depositing a masking layer (e.g., a self-aligned monolayer), depositing a copper capping layer, or performing a clean operation. Other combinatorial processes, including various types of depositions (e.g., electrochemical deposition, physical vapor deposition (PVD), chemical vapor deposition (CVD)) are also possible.

In operation 706, a fluid is introduced into the first aperture of the stirrer. The first aperture is at a first end of a body of the stirrer, and is, for example, the first aperture 110. The fluid may be introduced using a dispenser such as the dispensers 208, and may be introduced using one of several techniques. For example, as described above, the fluid is continuously introduced for a predetermined amount of time, possibly to cause a choked flow. Alternatively, a predetermined amount or volume of fluid is introduced into the stirrer.

After the fluid is introduced, the fluid travels through the hollow interior of the stirrer and is dispensed out of a second aperture (e.g., the second aperture 112) at a second end of the body of the stirrer. The fluid is deposited onto a substrate, or a region thereof.

In operation 708, the fluid is agitated using an impeller. The impeller is at the second end of the body of the stirrer (e.g., the impeller 102). The impeller may be aligned approximately along an axis of the body parallel to the length of the body, and the second aperture may dispense fluid over the impeller.

The agitation mimics the operation of a spin processor. For example, the agitation alters the flow 210 of the fluid coming out of the second aperture 112 such that the flow characteristics of the fluid are similar to those of a spin processor. The operation of a spin processor is described above. The agitation by the impeller may cause effects similar to those produced by a spin processor, and may improve interactions with the surface of the substrate.

In operation 710, the efficacy of the introduction and agitation is determined. Operation 710 may be considered part of a combinatorial evaluation process. For example, a fluid having a certain formulation is introduced to a region of a substrate using a stir, and agitated using an impeller. The results of the introduction and agitation are reviewed to determine the efficacy of the formulation. If the formulation is effective, useful, or somehow otherwise desirable, the formulation may be used on a full substrate processing, as described regarding operation 712.

According to another example, the multiple regions of the substrate each include at least one structure. At least a portion of the structure is formed to perform tests on the structures, and the structure may be any semiconductor feature, including front end of the line (FEOL) features such as transistors, or back end of the line (BEOL) features such as metallization. Determining the efficacy of the introduction and agitation may include evaluating the characteristics of the structure after the introduction and agitation, for example.

In operation 712, techniques to process another substrate are determined. The techniques may be based on the introduction and agitation of the fluid. For example, based on the efficacy of the introduction and agitation, it is determined that a certain formulation is useful for a full substrate. The techniques may include spinning another fluid compositionally similar to the fluid onto substantially an entire surface of the another substrate (e.g., using a spin processor).

Combinatorial Stirring Examples

FIG. 8 is a flowchart describing a process 800 for performing a clean operation using combinatorial processing with a stirrer according to various examples. The process 800 is an example of a process that is performed using the stirrer 100 to mimic a spin processor. The process 800 is an example of combinatorial stirring; it is understood that various other processes may also be performed using the embodiments described herein.

In operation 802, a cleaning solution is introduced to the substrate. The cleaning solution may be, for example, the ESC-700 or ESC-800 series of post-CMP cleaning solutions by Advanced Technology Materials, Inc. (ATMI) of Danbury, Conn., Clean 100, MR10, variations thereof, or any other cleaning solution. The cleaning solution may be applied for any amount of time, for example 30-300 seconds.

In operation 804, the substrate is rinsed. The substrate is rinsed to remove the residual cleaning solution. The substrate may be rinsed with water, for example, for 30 seconds or any amount of time desired. After the rinse, in operation 806, metrology is performed to determine the efficacy of the clean. For example, e-testing is performed to determine changes in capacitance and resistance of the substrate, or atomic force microscope (AFM) images are taken to observe physical changes. The results can then be used to determine techniques for processing a full substrate.

EXPERIMENTAL RESULTS

FIGS. 9A-9E are comparative images illustrating results from cleaning copper with and without stirring and brushing according to various examples described herein. These experimental results demonstrate that certain examples described herein may improve the effectiveness of processing techniques and/or may provide more predicative results when used with combinatorial processing.

Figures 9A, 9B:
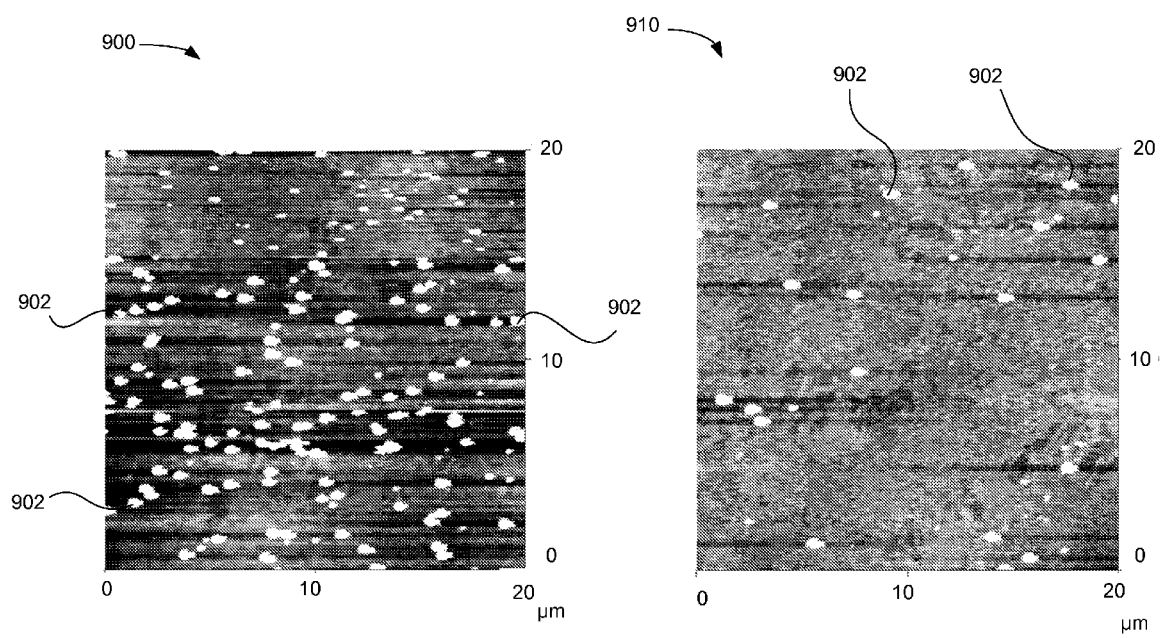
FIGS. 9A and 9B are images of a copper pad cleaned using a post-CMP cleaning solution without and with stirring, respectively.

FIG. 9A is an atomic force microscope (AFM) image 900 of a copper pad cleaned using a post-CMP cleaning solution without stirring. The cleaning solution used was ESC784 from ATMI, and was dispensed for 120 seconds at 25° Celsius. The clean was performed on a region of a substrate without stirring, and without otherwise agitating the cleaning solution. Debris 902 is visible as white spots (i.e., particles higher than 40 nm) in the AFM image 900.

FIG. 9B is an AFM image 910 of a copper pad cleaned using a post-CMP cleaning solution with stirring. The cleaning solution used was also ESC784 from ATMI. The clean was performed on a region of a substrate using stirring as disclosed above. Much less debris 902 is visible in the AFM image 910 than in the AFM image 900. Combinatorial processing using stirring therefore may be used to more effectively to mimic a spin processor and may be more predictive of full substrate processing results.

Figure 9C:
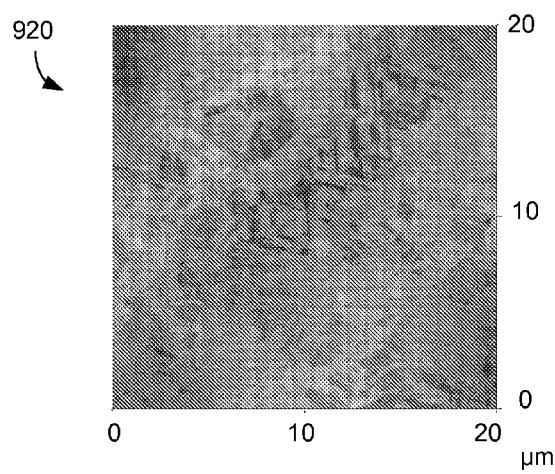
FIGS. 9C-9E are images of a copper pad cleaned using brushing.
Figure 9D:
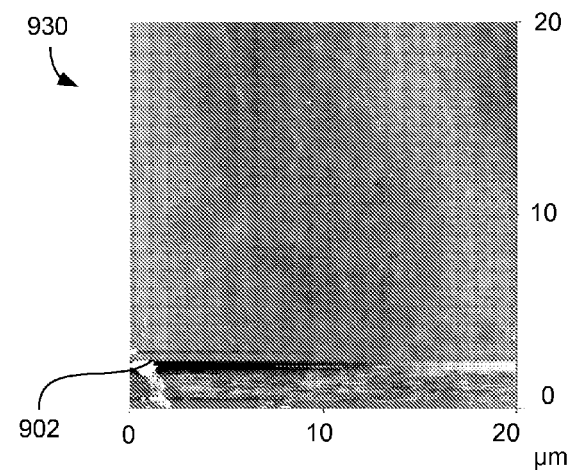
Figure 9E:
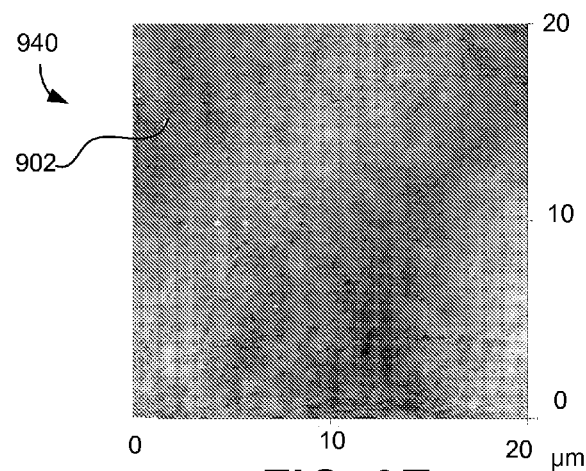

FIGS. 9C-9E are AFM images 920, 930, and 940 of copper pads cleaned using brushing. The brush is a PVA brush, and the cleaning solution was ESC784 from ATMI. The cleaning solution was dispensed for 120 seconds at 25° Celsius.

The image 920 is taken at the center of the pad, the image 930 is taken 1 mm from the center of the pad, and the image 940 is taken 2 mm from the center of the pad. As can be seen, very little debris 902 remains on the pad. The brushing effectively removes leftover particles.

Although the foregoing examples have been described in some detail for purposes of clarity of understanding, the invention is not limited to the details provided. There are many alternative ways of implementing the invention. The disclosed examples are illustrative and not restrictive.

What is claimed:

1. An apparatus, comprising:
a body comprising a first end and a second end;
a first aperture at the first end of the body to receive a fluid to process a region of a substrate in a combinatorial manner; and
a second aperture at the second end of the body to dispense the fluid onto the substrate; and
an impeller at the second end of the body to agitate the fluid and to facilitate interaction of the fluid with a surface of the substrate, the impeller located below the second aperture, wherein the body is configured to rotate, the impeller is affixed to the second end and wherein the impeller extends outward between the second aperture and a third aperture at the second end of the body, wherein the fluid exits the second and third apertures along outer surfaces of the impeller.

2. The apparatus of claim 1, further comprising a brush at the second end of the body.

3. The apparatus of claim 2 wherein the brush is substantially as wide as the region.

4. The apparatus of claim 1 further comprising a sleeve configured to accept the body and comprising a baffled interior configured to alter flow characteristics of the fluid when the body is rotating, baffles of the baffled interior disposed outside of the impeller.

5. The apparatus of claim 1, wherein:
the body is approximately cylindrical and comprises a hollow interior connecting the first aperture and the second aperture and third aperture;
the impeller extending through an axis of the body parallel to a length of the body, wherein the body rotates around the axis: and
the second aperture and third aperture are configured to dispense the fluid over the impeller.

6. The apparatus of claim 1, wherein the impeller is configured to alter a flow of the fluid and to mimic a spin processor.

7. The apparatus of claim 1, wherein the body is configured to be height adjustable relative to the substrate.

8. The apparatus of claim 1, wherein the fluid is chosen from the group consisting of a cleaning fluid, a deposition fluid, an electroless deposition fluid, and an electrochemical deposition fluid.

9. The apparatus of claim 1, wherein the first end and the second end share a common axis of rotation.

10. An apparatus, comprising:
a body comprising a first end and a second end;
a first aperture at the first end of the body to receive a fluid to process a region of a substrate; and
a second aperture at the second end of the body and a third aperture at the second end of the body to dispense the fluid onto the substrate; and
an impeller to agitate the fluid, the impeller located below the second and third apertures and extending between the second and third apertures, wherein the impeller extends outward between the second aperture and a third aperture at the second end of the body, wherein the fluid exits the second and third apertures along outer surfaces of the impeller wherein the body is configured to rotate.

11. The apparatus of claim 10, further comprising a brush at the second end of the body.

12. The apparatus of claim 10, further comprising a sleeve configured to accept the body and comprising a baffled interior configured to alter flow characteristics of the fluid when the body is rotating, baffles of the baffled interior disposed outside of the impeller.

13. The apparatus of claim 10, wherein:
the body is approximately cylindrical and comprises a hollow interior connecting the first aperture and the second aperture and third aperture;
the impeller extending through an axis of the body parallel to a length of the body, wherein the body rotates around the axis: and
the second aperture and third aperture are configured to dispense the fluid over the impeller.

14. The apparatus of claim 10, wherein the impeller is configured to alter a flow of the fluid and to mimic a spin processor.

15. The apparatus of claim 10, wherein the body is configured to be height adjustable relative to the substrate.

16. The apparatus of claim 10, wherein the fluid is chosen from the group consisting of a cleaning fluid, a deposition fluid, an electroless deposition fluid, and an electrochemical deposition fluid.

* * * * *